April 22, 1941.　　C. R. CRANNELL　　2,239,439
DUAL CONTROL PEDAL
Filed July 17, 1940
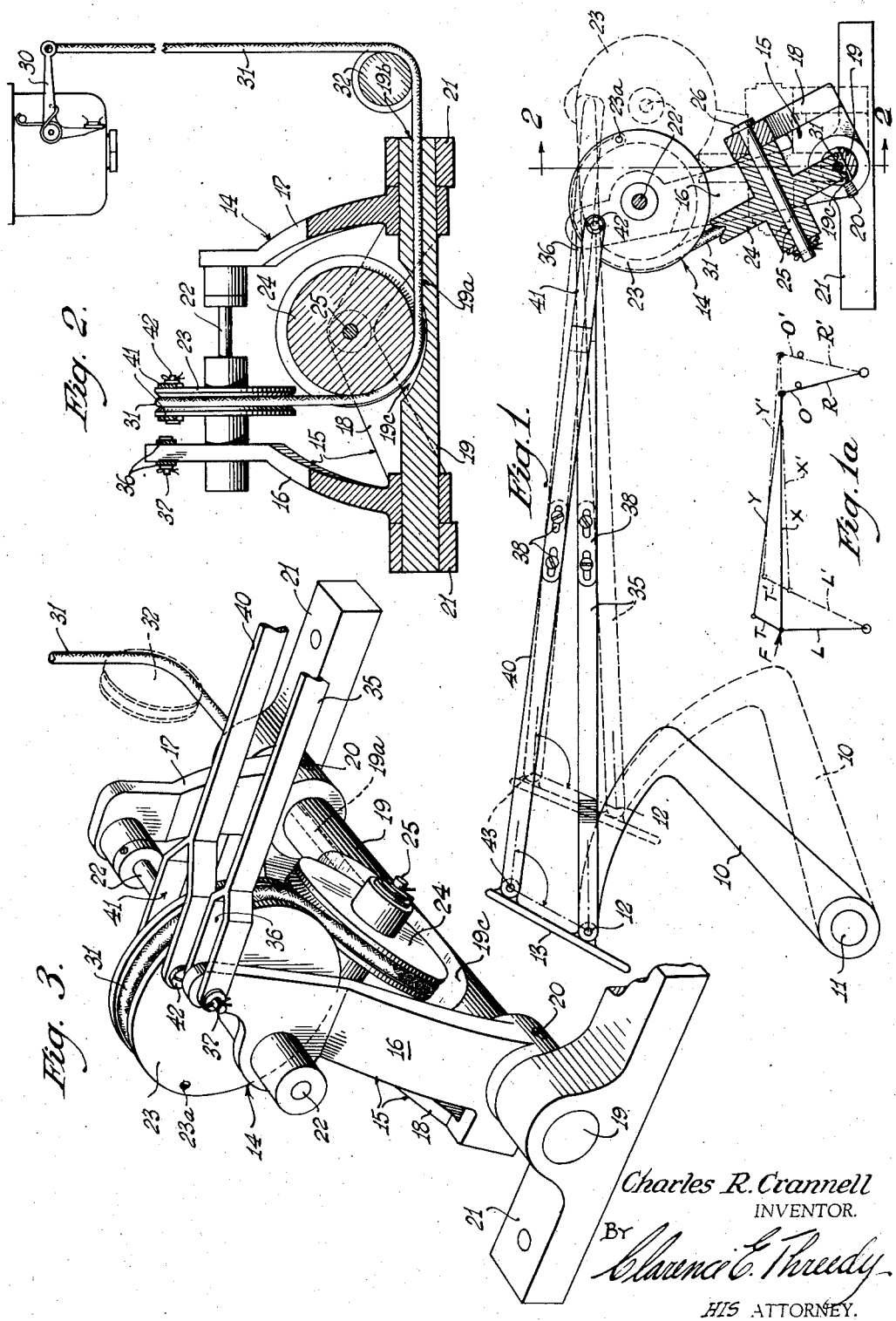
Charles R. Crannell
INVENTOR.
By Clarence E. Threedy
HIS ATTORNEY.

Patented Apr. 22, 1941

2,239,439

UNITED STATES PATENT OFFICE 2,239,439

DUAL CONTROL PEDAL

Charles R. Crannell, Chicago, Ill.

Application July 17, 1940, Serial No. 345,878

6 Claims. (Cl. 74—478)

The principal object of this invention is the provision of a dual control pedal of general application and especially suited for use with automotive vehicles to provide a combination brake (or clutch) and accelerator control adapted to facilitate maneuvering the vehicle on hills to prevent stalling where it is necessary to apply the brake without idling the motor, as is the case where the foot is withdrawn from the accelerator to operate the brake.

Another object is the provision of a dual control pedal adapted for use with vehicles of all classes to enlarge the simultaneous operating control which the operator can exercise over the vehicle.

Viewed from another aspect, it is an object of the invention to provide a dual pedal control including a pedal, a treadle carried by the pedal, and control mechanism linked with the pedal and treadle and so arranged that rocking movements of the pedal will not affect the control, but movements of the treadle relative to the pedal will affect the control.

A further object is the arrangement of a pedal with a pivotal treadle thereon and control means including a rocking member linked with the pedal to follow the movements of the latter, together with an actuating element on the rocking member linked with the treadle for actuation by the latter responsive only to pivotal movements of the treadle relative to the pedal.

Yet another object is the combination of a rocking lever or pedal having a treadle pivotally mounted thereon and control mechanism including a rocking member and an oscillable member mounted thereon, together with link means pivotally interconnecting the pedal, the treadle, and the rockable and oscillable members in such manner that a force applied to the treadle in a given direction to operate the pedal will not only displace the latter, but will also move the treadle relative to the pedal without causing angular displacement between the oscillable and rockable members so that no operation of the control mechanism will be affected thereby; pivotal movement of the treadle without a corresponding displacement of the pedal, however, will cause displacement of the oscillable member and thereby actuate the controlled device which may be, for example, the accelerator of an automobile in which the pedal is arranged to operate the brake.

A still further object is the provision of a dual control pedal and control mechanism coacting therewith and including a rockable member linked with the pedal to move back and forth corresponding to the movements of the pedal, a treadle pivoted on the pedal, and pulley means carried on the rockable member and linked with the treadle for actuation by the latter, together with means operatively associated with the pulley means and extending coaxially of the rocking axis of the rockable member for connecting the control mechanism with an accelerator or other instrumentality, whereby the accelerator or other instrumentality will not be affected by rocking movements of the rocking member in response to the ordinary movements of the pedal.

Other objects, advantages and novel aspects of the invention reside in certain details of construction as well as the cooperative relationship of the component parts of the illustrative embodiment described hereinafter in view of the annexed drawing, in which:

Fig. 1 is a side elevation of the dual control mechanism with parts shown in section;

Fig. 1A is a graphic representation of the angular displacements of the elements of the control mechanism;

Fig. 2 is a vertical section through the control unit looking in the direction of lines 2—2 of Fig. 1, when the latter is in the dotted line position;

Fig. 3 is a perspective view of the control unit.

As shown in Fig. 1, the dual control pedal mechanism includes a pedal 10 mounted to rock on an axis 11 in the customary manner and adapted to control a brake or clutch in an automotive vehicle, for example. Pivotally mounted as at 12 on the pedal lever is a treadle plate 13 adapted to be engaged by the foot in actuating the pedal lever, the treadle plate pivoting relative to the pedal, as indicated by the dotted line representation, as the pedal recedes under the effort of the operator's foot.

Conveniently situated in advance of the pedal is a control unit or mechanism, generally indicated at 14 and shown in perspective in Fig. 3. This unit consists mainly of a rockable member 15 including opposite lever arms 16 and 17 joined by a web 18 (Fig. 2 also), the arms 16 and 17 being fixed on a cross shaft 19 by means such as the set screws 20, and the cross shaft being journaled in a pair of trunnion blocks 21 adapted to be fixed in the vehicle conveniently in advance of the pedal, as illustrated in Fig. 1.

Mounted on a smaller cross shaft 22 at the top of the rockable member is an oscillable actuating element or pulley 23. Another pulley 24 is mounted to rotate in a plane at right angles to that of the pulley 23 and nearly tangential to the latter, this pulley 24 being carried on a stud shaft 25 (Figs. 1 and 2 also) having a headed portion 26 seated in the cross web 18.

Means providing an operative connection between some controlled instrumentality such as an accelerator operating lever 30 (Fig. 2), or the like, includes a flexible link or cable 31 (Fig. 3) which has one of its ends fixed on the pulley 23, as by screw means 23a, to extend in the groove of the pulley and thence into the groove of pulley 24, and thence into a bore 19a formed in the main rock shaft 19 and leading out the right-hand end 19b so that the connecting link or cable 31 issues from the end of the rock shaft to extend over additional pulley means 32 for connection with the controlled instrumentality or accelerator lever 30. A mid portion 19c of the main rock shaft is gouged out so that the lower part of the second pulley 24 may be fitted close thereto to guide the cable properly into alignment with the bore 19a.

The aforesaid operating or control mechanism is connected with the pedal structure by means of a pedal link or strut 35 having a bifurcated formation 36 at one end which is connected by pin means 37 to one of the arms 16 of the rockable member, the opposite end of this link or strut being pivotally connected at the connection 12 between the treadle and pedal. Suitable means, such as the small intermediate links 38 may be utilized to adjust the length of the strut or main link.

In like manner, the oscillable or pulley member 23 is connected by a link or strut 40 by means of a bifurcation 41 at one end and pin means 42 engaged in the pulley, to the treadle plate 13, the opposite end of the link or strut 40 having pivotal connection 43 with the treadle plate 13 at a point remote from the pivotal mounting 12 thereof on the main pedal lever and in a direction which is generally radially displaced from the rocking axis 11 of this pedal. Similar link means 38 may be employed to adjust the length of the strut 40.

In the operation of the device, the pedal 10 will be displaced from its full line position of Fig. 1 by application of pressure of the foot to the treadle plate 13, and as the lever 10 recedes, the treadle plate will rock gradually into the dotted line position there shown, with a consequent displacement of both links or struts 35 and 40. An important feature of the foregoing arrangement of parts particularly with respect to the pivotal connections therebetween, resides in the fact that while both links or struts 35 and 40 are displaced as aforesaid during ordinary movement of the pedal 10, there will be no effective movement of the oscillable or pulley member 23, notwithstanding the fact that the rockable means 16—17 etc. will of necessity be rocked in an amount corresponding to the movement of the link or strut 35.

The reason for the foregoing behavior of the mechanism is illustrated graphically in Fig. 1A wherein the arm T represents the treadle and its pivotal connection with the pedal lever L, while the links or struts are respectively indicated by the characters X and Y, the link X connecting with the rockable member R and the link Y from the treadle connecting with the pulley or oscillable member O. Assuming that a resultant operating force F is applied at the pivotal juncture between the treadle T and lever L in the direction of the arrow, the parts will assume the positions designated by the prime characters and dash-dot lines, and it will be observed that the treadle T has assumed a position almost in parallelism with the lever line L'; however, comparison of the angles T—Y and T'—Y', T—X and T'—X', as well as the corresponding angles at the connections with R and O, will disclose no change. In other words, so long as the treadle and pedal are moved simultaneously by application of a force intended to displace the pedal in the customary manner, there is no change.

In order to actuate the control mechanism 14 and effect operation of the controlled instrumentality or accelerator 30, it is necessary that the treadle 13 be rocked independently of movement of the pedal 10—in other words, it is necessary that the treadle be pivoted relative to the pedal lever while the latter is at rest, although such movement of the treadle may be effected in any of the several positions of displacement of the pedal lever. Under these conditions, the link 40 will be displaced while the link 35 remains at rest, and in consequence of this the rockable member of the control unit remains stationary while the pulley is displaced and the flexible link or pulley 31 in consequence is moved to actuate the lever 30.

It is contemplated that the novel control mechanism will be used with automotive vehicles although it will appear to those skilled in the art that the device may be applied with equal effectiveness to aeronautical conveyances where complex control devices are of especial necessity. The invention is also susceptible of more general application in any situation where dual control of the class described is required.

It is to be understood herein that reference to "joint movement" or "movement together" of the pedal and treadle, means correlative or interdependent movement in the customary manner of operating a foot pedal with a pivoted treadle. It would be possible by extraordinary manipulation to pivot the treadle independently of the pedal while the latter was in motion, but this would not constitute an interdependent "movement together" or "jointly" in the ordinary sense, as intended herein.

The various advantages and objects of the invention may be accomplished by modifications of the particular embodiment specifically described herein, and it is intended that the appended claims shall include all equivalent arrangements fairly coming within their call.

Having thus described my invention, what I claim as new and desire to protect by Letters Patent is:

1. In an automotive vehicle, the combination with a control pedal and an accelerator in said vehicle, of dual control means comprising a treadle pivoted on said pedal, a rockable member mounted to rock about an axis approximately parallel with that of the treadle and pedal, an oscillable member mounted on said rockable member for movement about an axis parallel with the axis of the latter, means operatively linking said pedal with said rockable member, means operatively linking said treadle with said oscillable member, means operatively linking said oscillable member with said accelerator, the relative angular displacements of said treadle, said pedal, and said rockable and oscillable members effected through the agency of said linking means being such that joint pivotal movement of the treadle and pedal will effect no oscillatory movement of the oscillable member relative to said rockable member, but pivotal movement of the treadle while the pedal remains stationary will effect displacement of the oscillable member to actuate said accelerator.

2. A dual pedal control mechanism comprising, in combination, a rockable member, a pedal mounted to rock about an axis approximately parallel with that of said rockable member, a treadle pivoted on said pedal to rock about an axis in parallelism with that of the pedal, a movable element carried by said rockable member, means pivotally connected with said treadle and said movable element for moving the latter responsive to rocking movement of the treadle on the pedal, said movable element being adapted for connection with a controlled instrumentality, means pivotally connected with said pedal and said rockable member for effecting movement of the latter when the pedal is rocked, the relative angular displacements of said pedal, said treadle, said rockable member, said movable element, and the means pivotally connected thereto as aforesaid, being calculated so that joint rocking movement of the treadle and pedal will effect displacement of the rockable member without effecting movement of the movable element relative to the rockable member, while rocking movement of the treadle without simultaneous movement of the pedal will effect movement of the movable element relative to the rockable member without displacement of the rockable member, whereby to actuate said instrumentality.

3. A device of the class described comprising, in combination, a rockable member, a pedal mounted to rock about an axis in approximate parallelism with that of the rockable member, means pivotally connected to the pedal and rockable member providing an operating link therebetween, an oscillable member mounted on said rockable member, a treadle pivoted on said pedal, link means pivotally interconnecting the treadle and oscillable member, the relative angular displacements of the treadle, the pedal, the oscillable and rockable members through the agency of said link means being such that the oscillable member is effectively moved only by rocking movement of the treadle while the pedal is stationary, joint movement of the treadle and pedal being incapable of causing movement of the oscillable member relative to the rockable member, and means connected with said oscillable member having a portion extending coaxially of the rocking axis of said rockable member for connecting the oscillable member with a controlled instrumentality, whereby displacements of the rockable member alone will not effect operation of said instrumentality.

4. In a device of the class described, a rockable member, a pedal, means pivotally linking the pedal and rockable member for joint movement, an oscillable member on the rockable member, a treadle pivoted on the pedal, means pivotally linking the treadle and oscillable member, a second oscillable member on said rockable member, cable means connected with said first oscillable member and trained on said second oscillable member with a portion extending in part coaxially of the rocking axis of the rockable member, said cable being adapted for operative connection with a controlled instrumentality to be actuated by movement of the first-mentioned oscillable member, said first-mentioned oscillable member being moved responsive to movement of the treadle relative to the pedal while the latter is stationary.

5. A device of the class described comprising, in combination, a pulley member, means providing a rockable mounting for said pulley member and including a rock shaft on which said means is mounted, a second pulley member mounted on said last-mentioned means for movement in a plane which is approximately normal and tangent to said first-mentioned pulley, cable means connected to said first-mentioned pulley and trained on said second-mentioned pulley, said rock shaft being disposed to extend in the plane of said second pulley and close to the periphery of the latter, said rock shaft having a bore extending in the direction of the length thereof, and a portion of said cable extending from said second pulley through said bore for connection with a controlled instrumentality, together with pedal means operatively connected with said rockable mounting and said first-mentioned pulley for actuating the same, movement of the rockable mounting being incapable of effecting displacement of the cable.

6. In a device of the class described, the combination with a foot pedal adapted to control a first instrumentality, and a second instrumentality to be controlled thereby, auxiliary control means comprising a treadle pivoted on said pedal, a rockable control unit, means linking said unit and pedal for joint angular displacement, an oscillable member carried with said unit for movement relative thereto, means linking said treadle and oscillable member for angular displacement jointly with the treadle, and means operatively linking said oscillable member and second controlled instrumentality for actuating the latter by angular displacement of the former responsive to operation of its treadle as aforesaid, said means linking the pedal and rockable unit and said treadle and oscillable member being related for angular displacement so that joint movement of the treadle and pedal will not effect operative movement of the oscillable member, but movement of the treadle relative to the pedal will effect operative movement of the oscillable member.

CHARLES R. CRANNELL.